United States Patent [19]
Watts

[11] 3,743,238
[45] July 3, 1973

[54] METHOD AND APPARATUS FOR A CONTROL VALVE
[75] Inventor: John D. Watts, Houston, Tex.
[73] Assignee: Hydril Company
[22] Filed: Nov. 26, 1971
[21] Appl. No.: 202,217

[52] U.S. Cl.............. 251/118, 210/392, 210/448, 137/550, 137/1
[51] Int. Cl............................................. F16k 47/04
[58] Field of Search.................. 251/118, 206, 127, 251/212, 131, 398; 210/390, 392, 428, 448, 489; 137/550, 625.33, 1

[56] References Cited
UNITED STATES PATENTS
| | | | |
|---|---|---|---|
| 98,596 | 1/1870 | Hudson | 210/398 |
| 622,708 | 4/1899 | Page | 137/550 X |
| 3,312,241 | 4/1967 | Bryant | 137/625.33 X |
| 3,514,074 | 5/1970 | Self | 251/127 |
| 2,601,231 | 6/1952 | Smith et al. | 137/625.33 |
| 2,993,488 | 7/1961 | Stec | 137/625.33 X |
| 3,396,904 | 8/1968 | Janette | 251/212 X |

FOREIGN PATENTS OR APPLICATIONS
155,349   9/1932   Switzerland........................ 137/550

Primary Examiner—Henry T. Klinksiek
Attorney—Guy E. Matthews

[57] ABSTRACT

A gate-type flow control valve having a sound suppressing apparatus for converting and absorbing fluid pressure energy in controlling the flow of fluid in the valve by selectively throttling the fluid to a lower pressure.

13 Claims, 6 Drawing Figures

Patented July 3, 1973

John D. Watts
INVENTOR

BY

Pravel Wilson & Matthews
ATTORNEYS

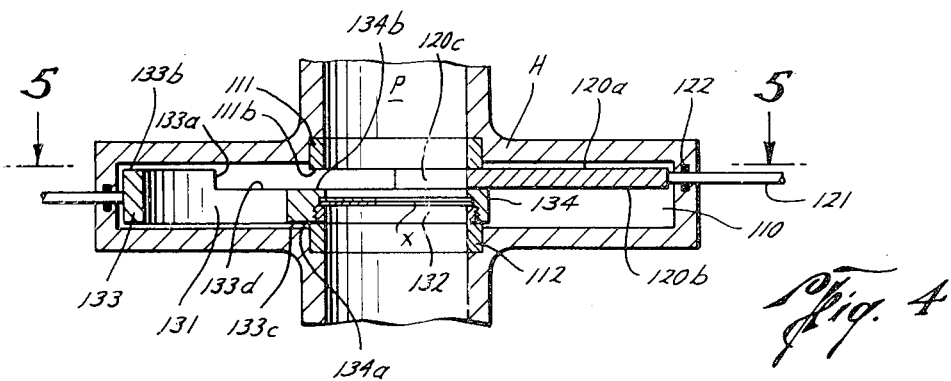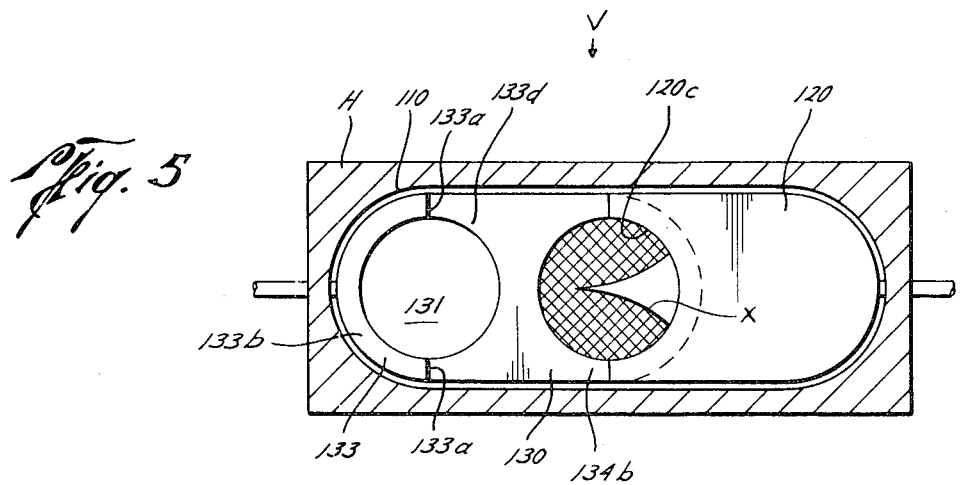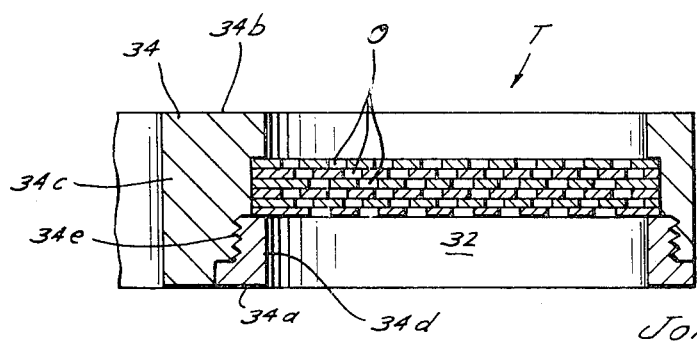

METHOD AND APPARATUS FOR A CONTROL VALVE

CROSS-REFERENCE TO RELATED APPLICATION

This application is related to my co-pending application entitled "SOUND SUPPRESSING METHOD AND APPARATUS", Ser. No. 201,704, filed Nov. 24, 1971.

BACKGROUND OF THE INVENTION

This invention relates to the field of a flow noise suppressing control valve apparatus and method.

Previously, control valves throttling a flowing stream of fluid to a lower pressure have produced sufficient noise to constitute a nuisance to persons near the control valve. In addition to the audible vibrations, the throttling process produced mechanical vibrations by the uncontrolled turbulent fluid mixing in the valve which were induced into the control valve and connected piping. These vibrations frequently caused premature operational failure of the valve, necessitating the replacement of expensive valve parts as well as interrupting the flow of fluid while the necessary repairs were made. These vibrations have also produced great safety hazards by loosening nuts on high pressure piping flanges near the valve and by causing fatigue failure of instrument pressure tubing lines.

Previously, relatively inexpensive gate valves with low flow resistance have not been suitable for use as a flow throttle valve because of their non-linear flow control characteristic and the tendency of the throttled fluid flow to cut or otherwise damage the gate sealing surface which rendered the valve inoperative. The more expensive globe, Y or angle valves normally employed in flow throttling service have attempted to reduce the production of vibrations by changing the shape of the plug, the seat, or both, but have previously enjoyed only limited success. The addition of mufflers or silencers downstream of the control valve have reduced the level of noise, but have not eliminated the damaging vibrations produced in the throttling process.

SUMMARY OF THE INVENTION

This invention relates to a new and improved method and apparatus for a control valve.

A flow control valve having a closure member and a sound suppressing flow throttling assembly for controlling flow of fluid through the valve. The flow throttling assembly includes a plurality of stacked plates with each plate having a plurality of openings therethrough with each opening in a plate communicating with a plurality of openings in the next adjacent plate. The plates are selectively moveable to effect the desired throttling by directing the flow through the plurality of openings in the plates. The valve closure member cooperates to move to control the number of openings in the plates through which the flow is directed.

BRIEF DESCRIPTION OF THE DRAWINGS

FIG. 4 is a side view, in section, of another form of the control valve of the present invention;

FIG. 5 is a view taken along lines 5—5 of FIG. 4; and

FIG. 6 is a side view, in section, of the sound suppressing apparatus illustrating the relationship of the communicating openings in the adjacent stacked plates.

DESCRIPTION OF THE PREFERRED EMBODIMENTS

Attention is directed to the FIGS. where the control valve apparatus of the present invention, generally designated V, is illustrated. The control valve apparatus V includes a valve body or flow housing H having an opening or flow passage P formed therethrough for communicating the flow of fluid to be controlled through the valve V. The valve V is provided with standard end connections (not illustrated) for securing the valve V with a flow conduit or pipe (not illustrated) on both sides of the valve V as well known in the art. The portions of the conduit on either side of the valve V have flow conducting bores which commuciate through the flow passageway P for communicating the flow through the valve V.

The cylindrical shaped flow passage P increases in size to form an elongated annular area 10 between a pair of spaced angular seat rings 11 and 12. The seat rings 11 and 12 have full openings 11a and 12a, respectively, therethrough which are aligned with passage P to provide a full opening minimum pressure drop passage P through the valve V. The seat rings 11 and 12 are secured with the housing H in a suitable manner, such as, but not limited to, by welding. The seat rings have facing lapped annular seating surfaces, 11b and 12b respectively, adjacent to the opening 10 as well known in the art.

Figure 1:
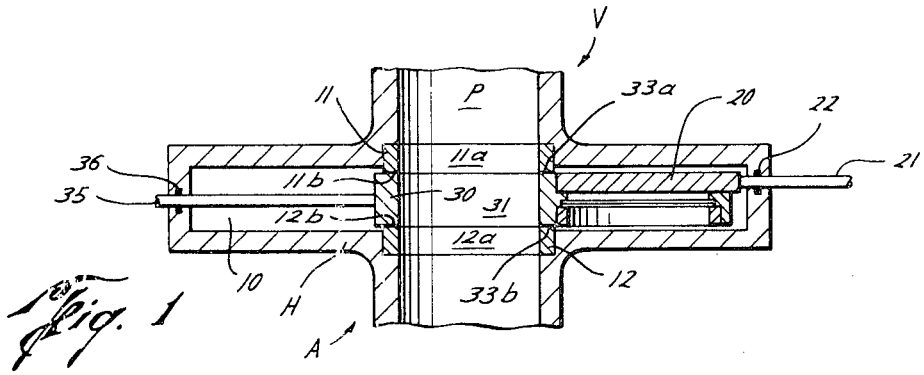
FIG. 1 is a side view, in section, of the control valve of the present invention in the full open position.
Figure 2:
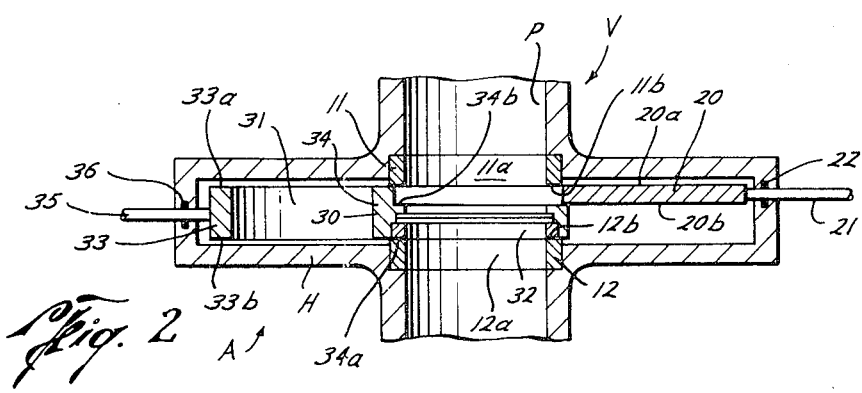
FIG. 2 is a view similar to FIG. 1, with the sound suppressing apparatus moved into a position for throttling the flow of fluid.
Figure 3:
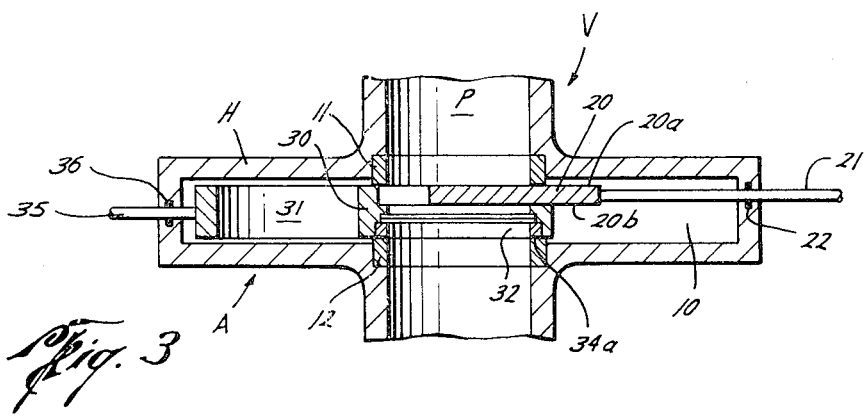
FIG. 3 is a view similar to FIG. 2, with a gate member of the control valve moved to a position to cooperate with the sound suppressing apparatus for throttling the flow of fluid.

As illustrated in FIGS. 1, 2 and 3, the first embodiment of the control valve V of the present invention includes a bore closure member or gate 20 which is moveably disposed in the annular area 10 to slide to and from a retracted or open position (FIGS. 1 and 2) enabling flow through the passage P and an extended or closed position where the gate 20 engages the sealing surface 11b of the seat ring 11 with a mating angular lapped seating surface 20a for blocking flow through the passage P. The gate 20 has a valve stem 21 secured thereto in a suitable manner for effecting sliding movement of the gate 20 to and from the open and closed position. The valve stem 21 is slidably sealed with the housing H by packing 22 to prevent leakage of fluid therebetween. The valve stem 21 may be manipulated to effect the desired positioning of the gate 20, either manually or automatically, both of which are well known in the art.

The gate 20 is suitably guided (not illustrated), as is well known, in the flow passage P to move transversly across the passage P in moving to and from the open and closed position. When the gate 20 is in the open position, flow passes straight through the passage P with essentially no flow resistance or flow pressure drop produced by the gate 20. This characteristic enables the control valve V to have an unusually large flow capacity for a specified size control valve in the open position.

The valve V includes a flow throttling assembly A which is also moveably disposed in the opening 10 for sliding movement to and from a first or throttling position for throttling flow of fluid through the passage P and a second or open position for enabling straight through flow through passage P. The throttling assembly A includes a slide member 30 having a spaced pair of flow channels or openings 31 and 32 therethrough for directing flow through the slide member 30. The opening 31 is formed by the bore of a ring-shaped portion 33 of the slide 30 which effects a seal with a pair of lapped annular sealing surfaces, 33a and 33b engaging the sealing surfaces 11b and 12b, respectively, of the stationary seat rings 11 and 12 when the slide 30 is in the open position. The opening 31 in the ring 33 thus provides a sealed straight-through flow conduit through the opening 10 of the passage P for conducting the flow of fluid with a minimum pressure loss directly through the opening 10 of the passage P when the slide 30 is in the open position.

The opening 32 is formed by a ring-shaped portion 34 of the slide 30 which aligns with the passage P when the slide 30 is in the throttling position. The ring 34 has a lapped annular seating surface 34a for sealing with the seating surface 12b of the seal ring 12 when the slide is in the extended position to block leakage of fluid therebetween. The ring 34 has a lapped angular sealing surface 34b adapted to engage a second lapped angular sealing surface 20b formed on the gate 20 for effecting a seal therebetween to prevent leakage of fluid. The sealing surface 20b is substantially parallel to the sealing surface 20a of the gate 20 to provide clearance to the gate 20 for sliding into sealing contact with the seal ring 11 and the slide ring 34.

Secured to the slide member 30, in a suitable manner, is an operating stem, 35, for effecting desired movement of the slide 30 to and from the retracted and extended positions. The housing H mounts a set of Chevron packing 36 for slidably sealing the housing H with the stem 35 to prevent leakage of fluid therebetween. Longitudinal sliding movement of the stem 35 to position the connected slide 30 may be effected by manual or automatic operating means, both of which are well known to those skilled in the art.

The flow throttling assembly A includes a plurality of stacked plates T mounted therewith with each plate having a plurality of openings O therethrough for communicating the flow through the plates T when the slide 30 is moved to align with the flow passage P. The plurality of openings O in the plurality of plates T cooperate to provide a means for selectively throttling to a desired lower pressure, at least a portion of the flow of fluid through the flow passage P, with the excess throttle fluid pressure energy converted for dissipation by directing the flow in a predetermined manner to block conversion of the pressure energy to mechanical energy. Reference is also made to my co-pending application entitled "SOUND SUPPRESSION METHOD AND APPARATUS", Ser. No. 201,704, filed Nov. 24, 1971, for a more detailed description of the layout of the openings O and the relationship of their relative communicating positioning on adjacent plates T to achieve the pre-determined flow pattern to effect the sound suppressing flow throttling pressure drop. As illustrated in FIG. 6, the plates T are preferably removeably positioned in the opening 32 transverse to the direction of flow through the opening 32. The ring 34 is formed in two portions 34c and 34d, secured together by a suitable means, such as threads 34e, for securing the plates T therein. This construction is preferable in that plates T may be readily added or subtracted by one skilled in the art to vary the flow throttling pressure loss achieved when the slide 30 is moved to the throttling position. This flexibility enables the valve to be rapidly adapted to various services and flow conditions.

Each of the openings O in the plate T communicates with the plurality of the openings O in the next adjacent plate T through a portion of each opening O for substantially simultaneously splitting the flow of fluid into a plurality of streams, by offsetting the flow direction of each of the plurality of streams, by converging the streams directed into each opening in the next adjacent plate and by expanding the flowing stream of each of the plurality of flowing streams in the opening in the next adjacent plate. These substantially simultaneous operations performed, on the flow occur each time the flow is communicated through an opening O into the plurality of openings O in the next adjacent plate T.

As illustrated in FIG. 3 when the slide 30 is in the throttling position, the gate 20 may be moved toward the closed position for cooperating with the slide 30 to control the flow to the plurality of openings O to provide additional pressure throttling to the flow of fluid.

In the second embodiment of the present invention illustrated in FIGS. 4 and 5, like reference characters are used to identify like parts. Corresponding reference numbers, increased by 100, are used to identify corresponding parts referenced in the first embodiment. The slidable closure gate 120 of the second embodiment, includes an elongated member having parallel sealing surfaces 120a and 120b with the sealing surface 120a continuously remaining in sealing contact with at least a portion of the sealing surface 111b of the stationary seat ring 111. The gate 120 has formed therethrough a semi-circular cross-sectional opening 120c positioned on the end of the gate 120, opposite the connection with the operating stem 121, which aligns with the passage P when the gate 120 is in the open position to form a portion of the conduit for conducting the flow straight through the space 110 of the passage P. The packing 122 slidably seals the housing H with the gate operating stem 121 to prevent leakage of fluid therebetween. When the gate 120 is moved to the closed position, the flow through the passageway P is totally blocked.

The slide 130 of the second embodiment also has two openings, 131 and 132 therethrough. The opening 131 is formed by the bore of the ring member 133 which aligns with the passageway P when the slide 130 is in the extended or full open position. The ring number 133 has a pair of spaced parallel vertical angular shoulders 133a engaging and sealing with the gate 120 to form the conduit for conducting the flow straight through the space 110 in passage P. The spaced parallel annular sealing surfaces 133b and 133c engage the sealing surfaces 111b and 120b, respectively, to prevent leakage of fluid therebetween when the slide 130 is in the full open position. The ring member 133, also has an angular sealing surface 133d that effects a seal with the seal ring 12 when the slide 130 is in the open position.

The opening 132 is formed by the bore of the flat member 134 having parallel spaced angular sealing surfaces, 134a and 134b effecting a seal with the seal fing 12 and the gate 120, respectively. As illustrated in FIG. 5, the seal between a portion of the gate 120 and the sealing surface 134b is continuously maintained irrespective of the relative position of the independently moveable gate 120 and the slide 130 due to the overlap at the extreme position. Movement of the gate 120 toward the closed position when the slide 130 is in the throttling position will restrict the flow communicated to the openings O in the plurality of plates T to provide additional flow control throttling by the control valve V. The semi-circular opening 120c of the gate 120 provides enhanced control of the additional throttling obtained in moving the gate 120 partially across the plurality of plates T in that initial movement of the gate 120 towards the closed position will effect a greater flow throttling than an equal movement of the disk-shaped gate 20 of the first embodiment of the present invention. As illustrated in FIG. 5, the plurality of plates T may be slotted or partially removed, as at X, in order that only a portion of the flow through the passage P is communicated through the plurality of openings O. Such arrangement enables the valve V to control the flow through a greater flow and pressure operating range.

In the use and operation of the present invention, the control valve V is connected with the flow conduit using the end connections of the control valve V, as is well known in the art. The gate operating stem 21 and the slide operating stem 35 are manipulated to slide the gate 20 and slide 30 to the desired initial locations which are normally the closed and throttling positions, respectively.

When it is desired to direct flow through the bore of the conduit, the gate stem 21 is manipulated to move the gate 20 toward the open position which initially enables a highly throttled flow through the portion of passage P not blocked by the gate 20. Movement of the gate 20 toward the open position increases the flow area through the passageway P and continually reduces the flow choking effect of the gate 20 in the passage P. This flow is communicated through the openings O in the plurality of plates T which further throttles the pressure of the fluid to control the flow. It is preferable the slide 30 be in the throttling position before commencing to manipulate the gate 20 in any manner to prevent the flow of fluid from eroding, cutting or otherwise damaging the sealing surfaces 20a and 20b of the gate 20. It will immediately be appreciated that this feature overcomes one of the most undesirable operating problems of a gate valve employed as a throttling valve.

When the gate 20 is in the full opening position, the openings O through the plurality of stacked plates T continue to throttle the flow of fluid by directing the flow through the tortuous labyrinth passage formed by the communicating openings O formed through the plurality of plates T. By adding or subtracting plates T, one skilled in the art may modify the valve V to quietly throttle the flow of fluid to any desired lower pressure. It will be immediately appreciated that the flow through the plurality of openings O in either direction will control the flow with equal efficiency.

Should it be desirable to increase the flow through the bore of the conduit, the stem 35 is manipulated to move the slide 30 to the open position which aligns the full bore opening 31 with the passage P. This position of the slide 30 enables the flow to be conducted straight through the housing H with minimum flow resistance provided by the valve V. The seals effected by the ring 34 with the stationary seat rings 11 and 12 insure that the flow is not communicated into the space 10 which would create flow currents that would increase the flow resistance of valve V. When the slide 30 is in this position, and the gate 20 is in the open position, the control valve V provides a straight through flow conduit, unlike most throttling valves which characteristically have an inherently high flow resistance. To regain throttling control of the flow, it is only necessary that the slide 30 be moved back to the throttling position by manipulation of the stem 35.

Should additional throttling be required to control the fluid flow, the gate 20 may be partially moved toward the closed position for choking the flow by restricting the flow passage P to provide the necessary additional throttling. Used in conjunction with the plates T having the slotted weir shaped passage X, the gate 120 of the second embodiment has a preferrred shape for effecting this additional flow throttling in moving partially toward the closed position.

The foregoing disclosure and description of the invention are illustrative and explanatory thereof, and various changes in the size, shape, and materials as well as in the details of the illustrated construction may be made without departing from the spirit of the invention.

What is claimed is:

1. A valve for controlling flow of fluid through the bore of a conduit including:
   a. a housing having a flow passage therethrough for enabling flow of fluid through said housing;
   b. a closure member disposed in said flow passage and movable to and from an open position enabling flow of fluid through said flow passage with essentially no pressure drop and to and from a closed position blocking flow of fluid through said flow passage;
   c. means mounted with said housing for effecting movement of said closure member to and from the open and closed positions; and
   d. means disposed in said flow passage for selectively throttling to a desired lower pressure at least a portion of the flow of fluid through said flow passage by converting the fluid pressure energy for dissipation by directing the flow in a predetermined manner wherein the flow of fluid through the conduit is controlled by throttling the flow in the valve.

2. The invention as set forth in claim 1, wherein: the flow of fluid may be selectively throttled when flowing in either direction through said flow passage of said housing wherein flow in either direction through the bore of the conduit may be controlled by the valve.

3. The invention as set forth in claim 1, wherein said means for selectively throttling to a desired lower pressure includes:
   a. a flow throttling assembly, operably disposed in said flow passage and having a plurality of stacked adjacent plates mounted therewith;
   b. each of said plurality of stacked plates having a plurality of openings therethrough; and
   c. each of said openings in each of said plates communicating with a plurality of openings in said next adjacent plate to direct the flow therethrough in the predetermined manner wherein the flow of fluid through said plurality of openings is throttled to control flow through the conduit.

4. The invention as set forth in claim 3, including:
a. said flow throttling assembly moveably disposed in said flow passage for movement to and from a first position for effecting a throttling flow of fluid through said plurality of openings in said plurality of plates and to and from a second position where the flow of fluid through said openings is substantially diverted; and
b. means mounted with said flow throttling assembly for effecting movement of said plurality of plates to and from said first position and said second position wherein said plurality of plates move to control flow through the bore of the conduit.

5. The invention as set forth in claim 4, wherein:
all of the flow of fluid through said flow passageway is directed through said plurality of openings in said plurality of plates for throttling when said flow throttling assembly is in said first position.

6. The invention as set forth in claim 4, wherein:
said closure member in moving to said closed position cooperates with said flow throttling assembly in said first position to control the flow through the plurality of openings in said plurality of plates wherein said closure member movement controls the flow of liquid through said flow passageway.

7. The invention as set forth in claim 4, wherein:
said flow throttling assembly includes a flow channel aligned with said flow passageway when said flow throttling assembly is in said second position for conducting the flow of fluid directly through said passageway.

8. The invention as set forth in claim 4, wherein:
said flow throttling assembly moves in a direction substantially transverse to the direction of flow in said flow passageway when moving between said first position and said second position wherein said flow throttling assembly moves across the flow of fluid to throttle the flow.

9. The invention as set forth in claim 4, wherein:
said closure member is in the form of a gate moving between open and closed positions transverse to the direction of flow in said flow passageway wherein said gate moves to a position across said flow passage in the closed position.

10. A method for controlling the flow of fluid through a flow passage formed in a control valve, including the steps of:
a. flowing a stream of fluid through the flow passage;
b. exposing selectively a flow throttling assembly to at least a portion of the flow through the flow passage for flowing through the throttling assembly;
c. reducing the fluid pressure of the stream by directing the flow in a predetermined manner through the flow throttling assembly for silencing the sound of the flow wherein the pressure of the stream is quietly throttled to a lower pressure for controlling the flow.

11. The invention as set forth in claim 10, including the step of:
Moving the flow throttling assembly into the flow passage for selectively exposing the flow throttling assembly to the flow.

12. The method as set forth in claim 10, wherein the step of directing the flow in a predetermined manner includes the substantially simultaneous steps of:
a. splitting the flow of fluid into a plurality of flowing streams of fluid;
b. choking the flow of each of the plurality of flowing streams of fluid;
c. directing a change in the flow direction of each of the plurality of flowing streams of fluid; and
d. offsetting the flow direction of each of the plurality of flowing streams by converging each of the streams with other streams of the plurality of flowing streams, quietly throttled to the lower pressure.

13. The invention as set forth in claim 11, including the step of:
moving a valve closure member to restrict the flow of fluid through the flow throttling assembly wherein the flow through the flow throttling assembly is restricted to control the flow of fluid.

* * * * *